United States Patent
Costabeber

(10) Patent No.: US 10,022,913 B2
(45) Date of Patent: Jul. 17, 2018

(54) CARTRIDGE FOR A STEREOLITHOGRAPHY MACHINE, STEREOLITHOGRAPHY MACHINE SUITED TO HOUSE SAID IMPROVED CARTRIDGE AND METHOD FOR USING SAID IMPROVED CARTRIDGE

(71) Applicant: Ettore Maurizio Costabeber, Zane' (IT)

(72) Inventor: Ettore Maurizio Costabeber, Zane' (IT)

(*) Notice: Subject to any disclaimer, the term of this patent is extended or adjusted under 35 U.S.C. 154(b) by 151 days.

(21) Appl. No.: 15/035,708

(22) PCT Filed: Dec. 17, 2014

(86) PCT No.: PCT/IB2014/067038
§ 371 (c)(1),
(2) Date: May 10, 2016

(87) PCT Pub. No.: WO2015/092717
PCT Pub. Date: Jun. 25, 2015

(65) Prior Publication Data
US 2016/0288421 A1    Oct. 6, 2016

(30) Foreign Application Priority Data
Dec. 19, 2013  (IT) .............................. VI2013A0302

(51) Int. Cl.
*B29C 67/00*    (2017.01)
*B33Y 30/00*    (2015.01)
(Continued)

(52) U.S. Cl.
CPC ........ *B29C 67/0085* (2013.01); *B29C 64/135* (2017.08); *B29C 64/20* (2017.08); *B33Y 30/00* (2014.12); *B33Y 40/00* (2014.12)

(58) Field of Classification Search
CPC . B29C 67/0085; B29C 64/106; B29C 64/124; B29C 64/129; B29C 64/135;
(Continued)

(56) References Cited

U.S. PATENT DOCUMENTS

| 5,503,793 A * | 4/1996 | Uchinono | B29C 41/12 |
| | | | 156/273.3 |
| 2001/0035597 A1 | 11/2001 | Grigg et al. | |
| 2004/0148048 A1* | 7/2004 | Farnworth | B33Y 50/02 |
| | | | 700/119 |

FOREIGN PATENT DOCUMENTS

| DE | 41 02 261 A1 | 7/1992 |
| EP | 1 769 903 A2 | 4/2007 |

OTHER PUBLICATIONS

International Search Report regarding PCT/IB2014/067038, dated Mar. 25, 2015 (4 pgs.).
(Continued)

*Primary Examiner* — Seyed Masoud Malekzadeh
*Assistant Examiner* — Lawrence D. Hohenbrink, Jr.
(74) *Attorney, Agent, or Firm* — Husch Blackwell LLP

(57) ABSTRACT

A cartridge (1) for a stereolithography machine, comprising: a container (2) provided with an access opening (3) and with a transparent bottom (4) opposite the access opening (3); a reservoir (5) suited to contain a liquid or pasty base material, unremovably associated with the container (2); valve means (6) suited to allow the passage of the base material from the reservoir (5) to the container (2), configured to open when the difference between the pressure present in the reservoir (5) and the pressure present in the container (2) is at least equal to a predefined value and to close spontaneously when the pressure difference is lower than the predefined value, the reservoir (5) comprising tight connection means (7) for connection to an external air feeding device (8).

23 Claims, 7 Drawing Sheets

(51) Int. Cl.
*B33Y 40/00* (2015.01)
*B29C 64/135* (2017.01)
*B29C 64/20* (2017.01)

(58) Field of Classification Search
CPC ..... B29C 64/20; B29C 64/255; B29C 64/259; B29C 64/307; B29C 64/321; B29C 64/343; B33Y 10/00; B33Y 30/00; B33Y 40/00
USPC .............................................. 425/174.4, 375
See application file for complete search history.

(56) References Cited

OTHER PUBLICATIONS

Written Opinion of the International Searching Authority regarding PCT/IB2014/067038, dated Mar. 25, 2015 (7 pgs.).

* cited by examiner

CARTRIDGE FOR A STEREOLITHOGRAPHY MACHINE, STEREOLITHOGRAPHY MACHINE SUITED TO HOUSE SAID IMPROVED CARTRIDGE AND METHOD FOR USING SAID IMPROVED CARTRIDGE

The present invention concerns an interchangeable cartridge for a stereolithography machine.

As is known, the stereolithography technique makes it possible to produce a three-dimensional object through the superimposition of a plurality of layers of a liquid or pasty base material that is solidified through exposure to predefined radiation, generally light radiation.

A stereolithography machine of the known type comprises a container suited to contain the base material and provided with a bottom that is transparent to the predefined radiation.

The machine comprises also emitter means suited to emit said predefined radiation and arranged under the container, which selectively solidify the layer of base material that is adjacent to the bottom of the container.

The solidified layers are supported by a modelling platform, powered so that it moves in the vertical direction in order to allow the last solidified layer to be arranged adjacent to said layer of base material before its solidification.

According to an embodiment described in the Italian patent application VI2012A000183, the container belongs to a removable device, which in technical jargon is called "cartridge", comprising also a reservoir suited to contain the base material and associated with the container in a non-removable way, so as to form a single body with it.

Further known embodiments are shown in documents U.S. Pat. No. 5,503,793 and DE 4102261.

When necessary, the base material is made flow out of the reservoir and into the container, through valve means that connect the two elements.

Said cartridge offers several advantages, among which the advantage of allowing the automatic top-up of the container in the moment when and to the extent to which this is required, as well as the advantage of avoiding the need to clean the stereolithography machine, as the reservoir and the base material feeding system are incorporated in the cartridge and therefore the base material does not contaminate any component of the machine.

Overall, said cartridge considerably simplifies the use of the stereolithography machine, making it suited to be used even by an unskilled operator like, for example, an operator working in the goldsmithery or dentistry sector.

It is the object of the present invention to provide an improved cartridge that, compared to the cartridge described above and belonging to the known art, is particularly simple to produce.

It is another object of the present invention to provide a cartridge that can be connected to a stereolithography machine in a simple and rapid manner.

It is also the object of the invention to provide a stereolithography machine that is suited to operate with said cartridge.

It is another, yet not the least object of the invention to provide a method for using the cartridge itself.

Said objects are achieved by a cartridge carried out according to the main claim.

Said objects are also achieved by a stereolithography machine according to claim 8 and by a method for using the cartridge according to claim 23.

Variant embodiments of the invention are illustrated in the corresponding dependent claims.

Advantageously, the simple construction structure of the cartridge of the invention makes it particularly economical to manufacture and suitable for mass production.

Still advantageously, the simple connection of the cartridge to the stereolithography machine further simplifies the use of the machine itself, to the advantage of its possible diffusion.

Said objects and advantages, together with others that will be mentioned below, will be evident in the description of a preferred embodiment of the invention that is provided by way of example without limitation with reference to the attached drawings, wherein.

Figure 1:
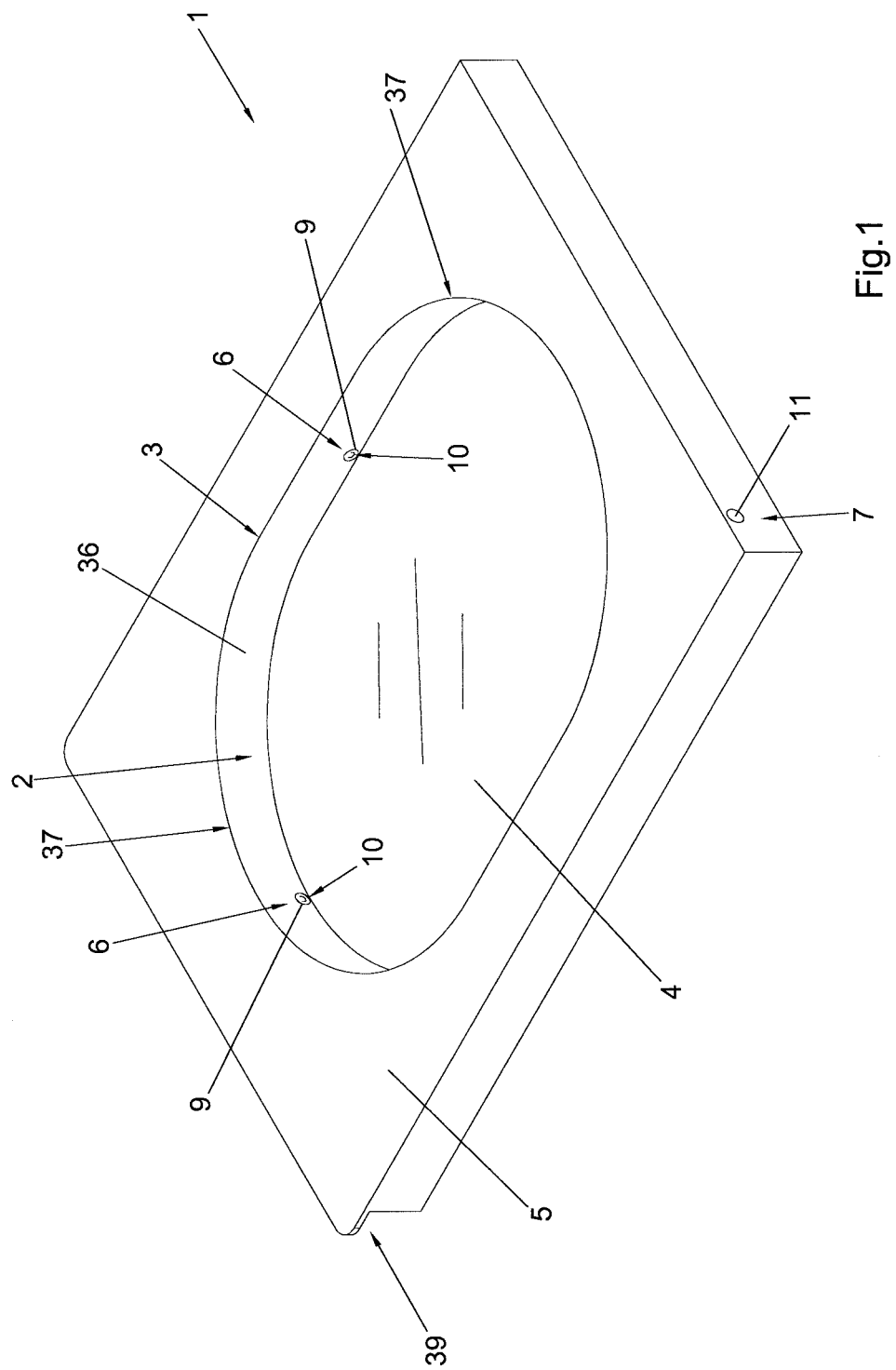
FIG. 1 shows a schematic axonometric view of the cartridge that is the subject of the invention.

The cartridge for a stereolithography machine that is the subject of the invention, shown in FIG. 1 and therein indicated as a whole by 1, comprises a container 2 provided with an access opening 3 and with a transparent bottom 4 facing and opposite to said access opening 3.

The access opening 3 is intended to allow the access of the modelling platform of a stereolithography machine of the type described in the introductory part and not illustrated in the figures, but known per se, into the container 2.

The transparent bottom 4 allows predefined radiation to pass therethrough, said predefined radiation being capable of selectively solidifying a pre-selected liquid or pasty base material contained therein.

Preferably but not necessarily, the base material is a light hardening resin or a photopolymer and the predefined radiation is light, for example a light beam. The cartridge 1 comprises also a reservoir 5 suited to contain said base material and forming a single body with the container 2.

The cartridge 1 also comprises valve means 6 that connect the reservoir 5 to the container 2 in such a way as to allow the passage of the base material from the reservoir 5 to the container 2.

According to the invention, the valve means 6 are configured in such a way that they open when the difference between the pressure present in the reservoir 5 and the pressure present in the container 2 is at least equal to a predefined value and close spontaneously when said pressure difference is lower than said predefined value.

The reservoir 5 furthermore comprises tight connection means 7 suited to connect the reservoir 5 to an external air feeding device.

The valve means 6 and the connection means 7 described above make it possible to control the outflow of the base material by simply operating the air feeding device in such a way as to increase the pressure present in the reservoir 5, stopping said outflow by stopping the air feeding device.

Preferably, the valve means 6 comprise a first membrane 9 provided with a hole 10 that is normally closed and is configured so that it opens elastically as a result of the effect of said pressure difference exceeding the predefined value.

Advantageously, said first membrane 9 represents a particularly economical way to produce the valve means 6 and therefore makes it possible to limit the cost of the cartridge 1.

Preferably, the valve means 6 are distributed on different points of the wall 36 that delimits the container 2 perimetrically and comprise corresponding first membranes 9 of the type described above.

Preferably, the connection means 7 comprise a second membrane 11 belonging to the wall of the reservoir 5, suited to be perforated by a needle-shaped element while at the same time maintaining its tightness when the needle-shaped element is arranged so that it passes through the second membrane 11.

Advantageously, said second membrane 11 makes it possible to connect the reservoir 5 to the air feeding device 8 in a simple and rapid manner, as described in greater detail below.

Preferably, the reservoir 5 is provided with an annular wall 36 that corresponds to the perimeter wall of the container 2.

Advantageously, the fact that the reservoir 5 delimits the container 2 perimetrically allows the valve means 6 to be distributed along the entire perimeter of the container 2 itself, in such a way as to guarantee the uniform and rapid outflow of the base material towards the container 2.

Preferably, said annular wall 36 comprises two mutually facing sections 37 with semi-circular profile.

Advantageously, the presence of said semi-circular sections 37 makes it possible to avoid the presence of sharp corners in the wall of the container 2, in such a way as to favour the rapid distribution of the base material in the container 2 itself.

Figure 7:
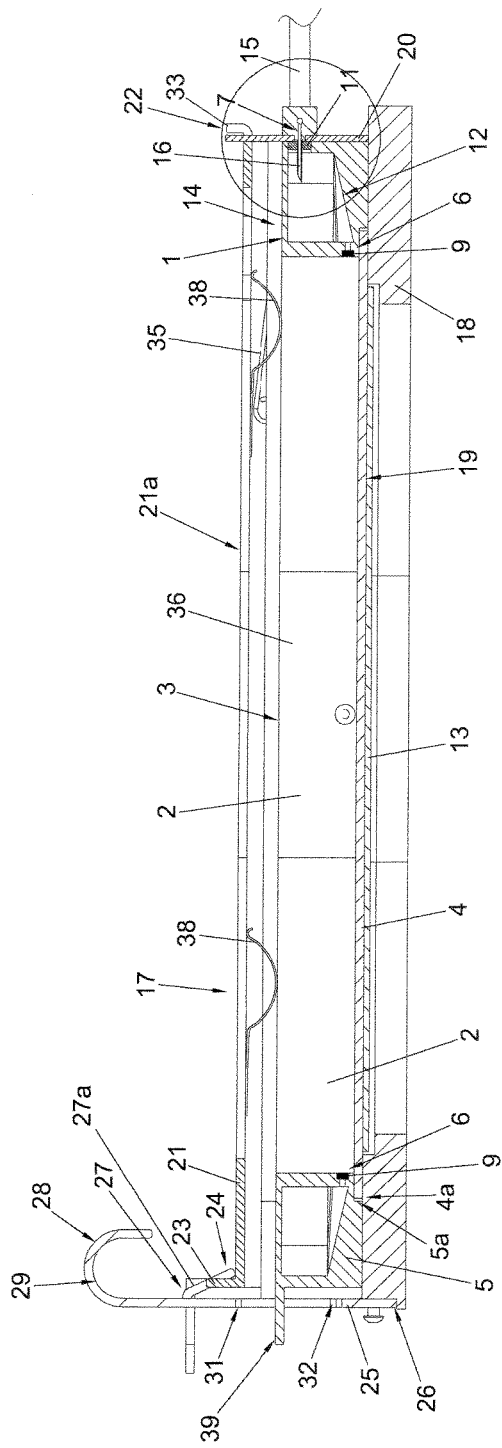
FIG. 7 shows the cartridge of FIG. 1 and the part of FIG. 2 associated together as in FIG. 6, in a sectional view according to a plane of symmetry.

Preferably and as shown in FIG. 7, the reservoir 5 is internally delimited by an inclined wall 12 that forms an angle larger than 90° and smaller than 180° with respect to the transparent bottom 4.

The valve means 6 are arranged at the level of said inclined wall 12, in particular of its edge nearest to the container 2.

In this way, to advantage, the inclined wall 12 makes it easier to convey the base material towards the valve means 6.

The configuration just described above offers the further advantage that the valve means 6 are always submerged by the base material, which prevents the air that is introduced in the reservoir 5 to increase pressure therein from obstructing the valve means 6 themselves and affecting the regular operation of the cartridge 1.

Regarding the transparent bottom 4, this is preferably delimited perimetrically by an outer edge 4a, housed in a cavity 5a belonging to the reservoir 5 in such a way that it is contained within the overall dimensions of the reservoir 5.

This advantageously makes it possible to limit the overall dimensions of the cartridge 1.

In variant embodiments of the cartridge, the transparent bottom 4 is integral with the reservoir 5.

The cartridge 1 is preferably provided with a cap, not shown in the drawings, which can be removably inserted in the access opening 3 in such a way as to close it.

Advantageously, the presence of said cap makes it possible to preserve any base material that may have been left in the container 2 during the periods of inactivity of the cartridge 1, in particular when the latter is temporarily removed. As already mentioned above, said cartridge 1 is suited to be associated with a stereolithography machine of which the drawings show just a part, corresponding to the area of the machine that is coupled with the cartridge 1.

Figure 2:
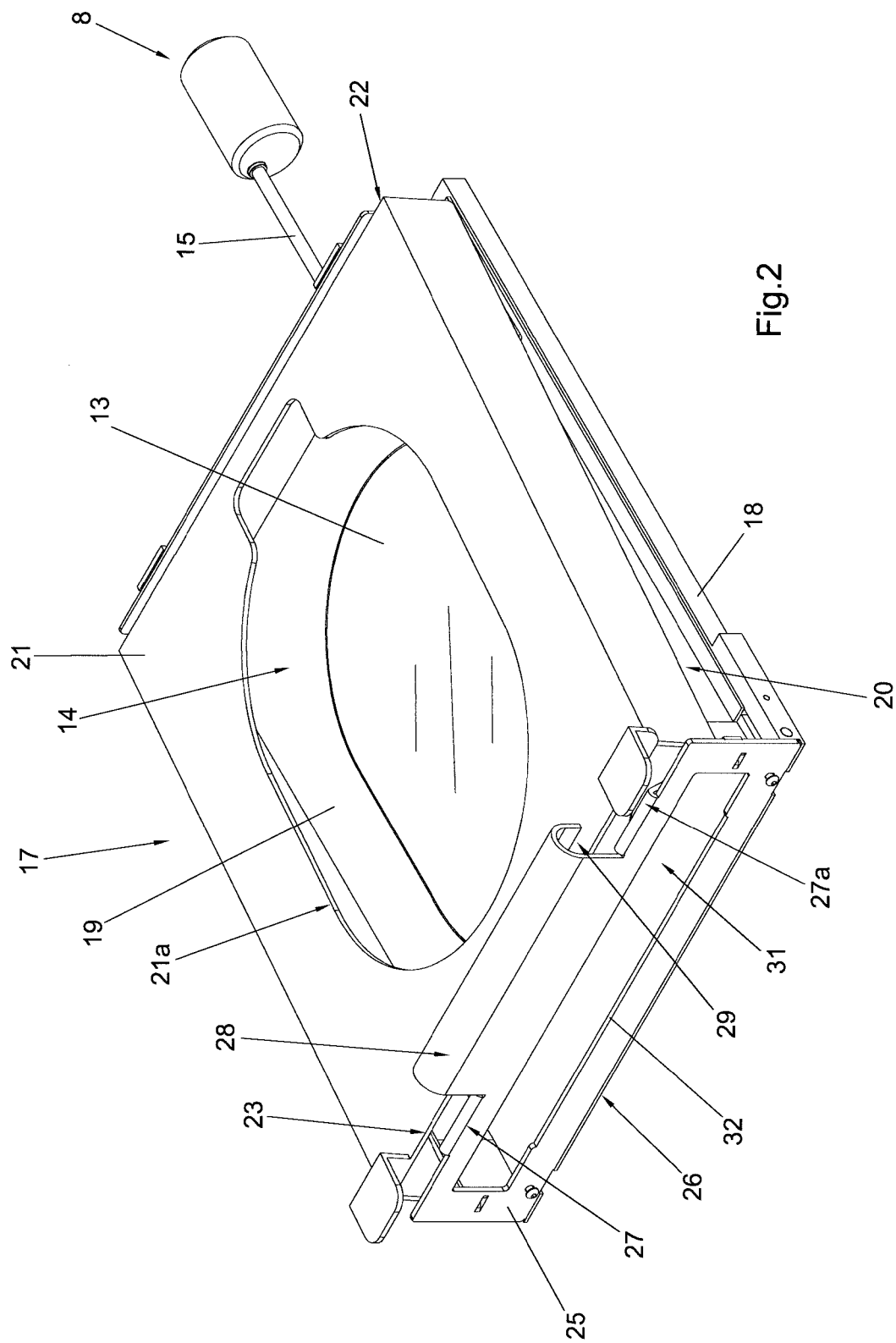
FIG. 2 shows a schematic axonometric view of a part of the stereolithography machine of the invention.

In particular, the stereolithography machine comprises a supporting structure that, as shown in FIG. 2, supports a housing 14 configured in such a way as to removably accommodate the cartridge 1 in a stable operating position.

The stereolithography machine furthermore comprises emitter means, not illustrated in the drawings but known per se, configured so as to emit said predefined radiation, associated with an optical unit in order to convey the radiation towards said housing 14.

Said emitter means may comprise, for example, a laser emitter, a projector or any other analogous means of known type.

The stereolithography machine comprises also a modelling plate, not represented in the drawings but known per se, suited to support the three-dimensional object during its production.

Said modelling plate is arranged in such a way that it faces the transparent bottom 4 of the cartridge 1 when the latter is in operating position and is associated with power means for its movement with respect to the housing 14, so that it can be moved near to and away from the transparent bottom 4 of the cartridge 1.

According to the invention, the machine comprises an air feeding device 8 provided with a feed duct 15 suited to be tightly connected to the connection means 7 of the cartridge 1 when the latter is arranged in the housing 14.

In particular, the air feeding device 8 is suited to be operated in such a way as to increase the pressure present in the reservoir 5 when it is necessary to cause the base material to flow towards the container 2 and to decrease it when it is necessary to stop said flow.

Preferably, the feed duct 15 is configured so that it can be removably connected to the connection means 7, in such a way as to allow the cartridge 1 to be easily removed from the machine.

Figure 3:
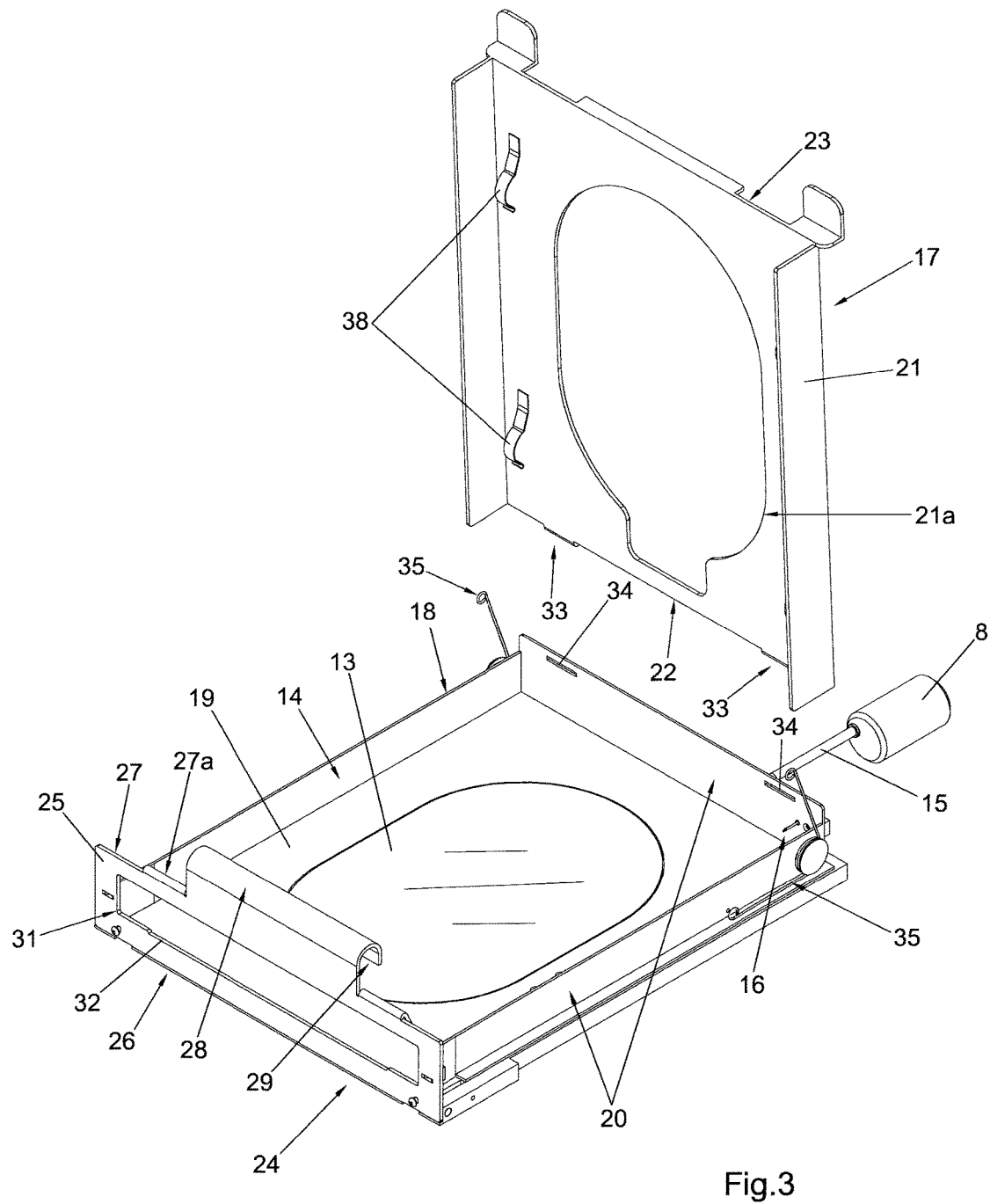
FIG. 3 shows an axonometric view of the part illustrated in FIG. 2 in a different operating configuration.

Preferably, the feed duct 15 comprises a needle-shaped end 16, visible in FIG. 3, suited to be arranged through the second membrane 11 when the cartridge 1 is arranged in said operating position.

Advantageously, the needle-shaped end 16 ensures the simple and rapid connection of the air feeding device 8 to the reservoir 5 of the cartridge 1.

Figure 8:
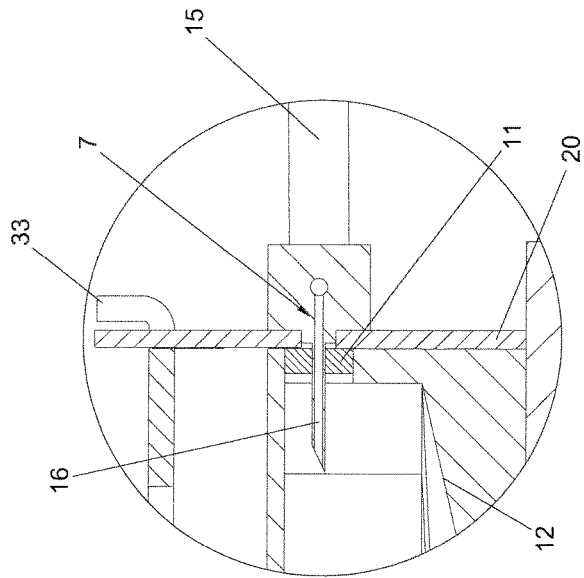
FIG. 8 shows an enlarged detail of FIG. 7.

In fact, as shown in FIGS. 7 and 8, when the cartridge 1 is arranged in operating position, the second membrane 11 of the cartridge 1 is perforated by the needle-shaped end 16 with no need for the operator to take care to activate any valve or sealing element, as tightness is already ensured by the second membrane 11, as described above.

Regarding the housing 14 for the cartridge 1, visible in particular in FIG. 3, it preferably comprises stop means 17 configured to maintain the cartridge 1 in operating position, which can be released in order to free the cartridge 1 from the housing 14.

Advantageously, said stop means 17 facilitate the connection of the cartridge 1 to the stereolithography machine, as well as its removal therefrom.

In particular, the housing 14 comprises a supporting base 18 that defines a supporting surface 19 suited to support the cartridge 1 on the side corresponding to the transparent bottom 4.

Preferably but not necessarily, the supporting surface 19 comprises a transparent sheet 13 arranged in such a way that it faces the transparent bottom 4 when the cartridge 1 is in operating position.

Advantageously, said transparent sheet 13 protects the underlying area of the stereolithography machine from dust and any base material that may contaminate it, the radiation emitter and the corresponding optical unit being arranged in said underlying area of the stereolithography machine.

Preferably, the transparent bottom 4 has the same geometry as the transparent sheet 13, that is, they are preferably but not necessarily plane, so that the two components are arranged in mutual contact when the cartridge 1 is arranged in operating position.

Advantageously, this avoids the formation of intermediate spaces that would shift the focus of the light beam with respect to the desired position, reducing the processing precision of the stereolithography machine.

The transparent sheet 13 is preferably flat and the curvature of the transparent bottom 4 is directed towards the outside of the cartridge 1.

Furthermore, the transparent sheet 13 is more rigid than the transparent bottom 4 of the cartridge 1.

For example, the transparent sheet 13 can be made of glass and the transparent bottom 4 can be made of a plastic material, for example methacrylate.

The different degrees of rigidity and the different curvatures described above are such that when the cartridge 1 is arranged in a stable position and pressed against the supporting base 18, the transparent bottom 4 of the cartridge 1 becomes deformed in such a way as to adhere perfectly to the transparent sheet 13.

According to a variant embodiment of the invention, the transparent sheet 13 is curved and the transparent bottom 4 has a curvature that is different from that of the transparent sheet 13 and such as to obtain the same compression effect described above.

Preferably and as shown in FIG. 3, said supporting surface 19 is delimited by a containment edge 20 that projects from the supporting surface 19 and is suited to come into contact with the cartridge 1 in such a way as to prevent it from sliding on the supporting surface 19.

The stop means 17 preferably comprise a cover 21 suited to face the supporting surface 19 in such a way as to come into contact with the cartridge 1 on the opposite side with respect to the supporting surface 19, as shown in FIG. 7.

Advantageously, the cover 21 maintains the cartridge 1 pressed against the supporting base 18, increasing the stability of the cartridge 1 itself during the operation of the stereolithography machine.

The cover 21 is provided with an opening 21a configured in such a way that it can be arranged so that it faces the access opening 3 of the cartridge 1 when the latter is in operating position and the cover 21 is in contact with the cartridge 1 itself.

Obviously, in variant embodiments of the machine said cover 21 can be replaced by equivalent elements capable of preventing the cartridge 1 from being lifted from the supporting base 18.

Preferably, the cover 21 is provided with elastic elements 38 configured so that they can be compressed when they come into contact with the cartridge 1, in such a way as to compensate for any defects of the cartridge 1 and in any case ensure contact with the latter.

Figure 4:
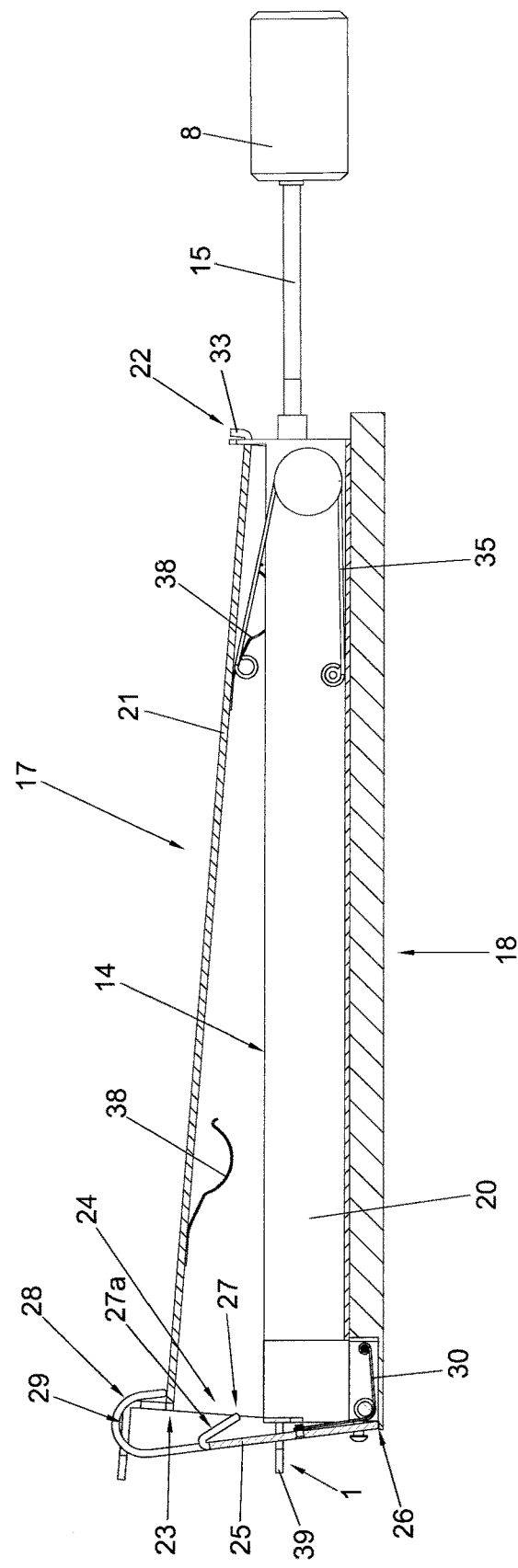
FIG. 4 shows a sectional view of the part illustrated in FIG. 2, according to a plane of symmetry.

Preferably, the cover 21 is provided with a first edge 22 revolvingly associated with the supporting base 18 and a second edge 23 opposite the first one and connected to the supporting base 18 through releasable snap-fitting means 24. Preferably and as shown in FIG. 4, said first edge 22 is provided with tabs 33 removably inserted in corresponding openings 34 belonging to the supporting base 18, in such a way as to allow both the rotation of the cover 21 with respect to the supporting base 18 and its removal from the supporting base 18. Advantageously, the possibility to remove the cover 21 allows the operator to easily access the supporting base 18 for periodical cleaning, if necessary.

Preferably, the containment edge 20 of the housing 14 comprises a manoeuvring wall 25 provided with a first end 26 and with a second end 27 that mutually oppose each other, the first end 26 being revolvingly associated with the supporting base 18 in such a way as to define for the manoeuvring wall 25 a stop position and a release position relating to the cartridge 1.

Figure 6:
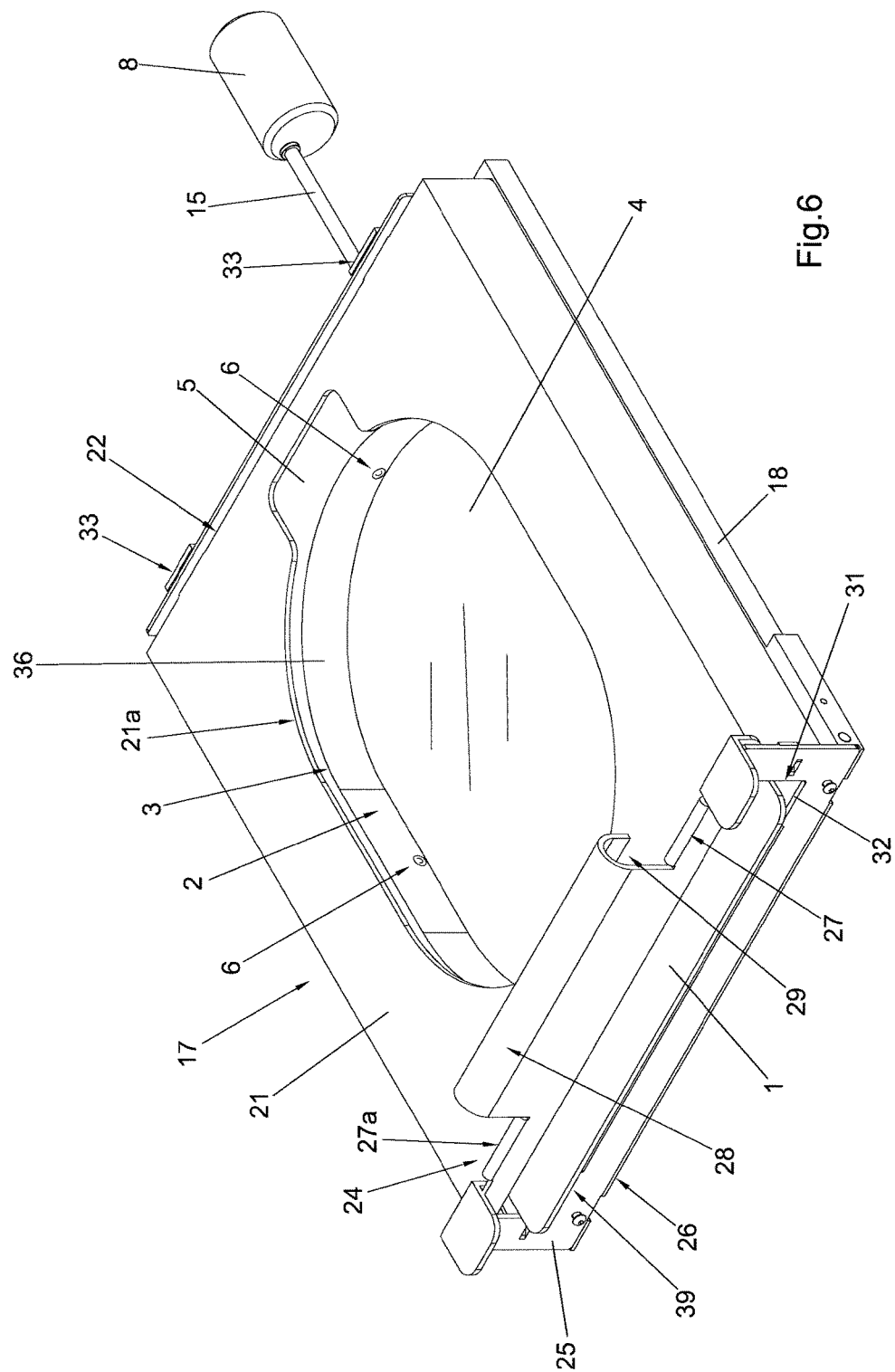
FIG. 6 shows an axonometric view of the cartridge of FIG. 1 associated with the part illustrated in FIG. 2, in an operating configuration different from the one shown in FIG. 5.

In the stop position shown in FIGS. 6 and 7, the second end 27 is arranged against the cover 21 when this is arranged in contact with the cartridge 1, so as to prevent the rotation of the cover 21 and avoid the accidental release of the cartridge 1 from the supporting base 18.

In the release position, shown in FIGS. 2 and 4, the second end 27 is arranged in such a way as to allow the rotation of the cover 21 in such a direction as to move it away from the supporting base 18, thus allowing the cartridge 1 to be lifted from the housing 14.

For this purpose, the cartridge 1 is preferably provided with an edge 39 projecting towards the outside of the housing 14, suited to make it easier for the user to hold and lift the cartridge 1.

Preferably, the second end 27 of the manoeuvring wall 25 is provided with a to chute-like surface 27a on which the second edge 23 of the cover 21 can freely slide during the rotation of the cover 21 towards the supporting base 18.

During the rotation of the cover 21 in the direction just described above, it slides on said chute-like surface 27a making the manoeuvring wall 25 rotate towards the release position.

When the cover 21 has reached the position of contact with the cartridge 1, it is released from the chute-like surface surface, thus allowing the manoeuvring wall 25 to be arranged in the stop position.

For this purpose, the manoeuvring wall 25 is preferably associated with first elastic means 30, shown in FIG. 4, suited to force the movement of the manoeuvring wall 25 itself from the release position towards the stop position.

Regarding the second end 27 of the manoeuvring wall 25, it is preferably provided with a stop surface 28 suited to limit said rotation of the cover 21 and, consequently, its opening with respect to the supporting base 18.

Preferably, there are second elastic means 35 suited to force the rotation of the cover 21 in the direction in which it opens with respect to the supporting base 18.

Advantageously, said second elastic means 35 facilitate the opening of the cover 21 and the release of the cartridge 1 from the housing 14, since it is sufficient for the operator to move the manoeuvring wall 25 to the release position in order to automatically cause the cover 21 to be lifted.

Preferably, the stop surface 28 is shaped in such a way as to define a concave portion 29 facing the second edge 23 of the cover 21, wherein said second edge in turn is configured to be arranged inside said concave portion 29 in such a way as to limit the rotation of the manoeuvring wall 25, as can be observed in FIG. 4.

Advantageously, said stop surface 28 makes it possible to prevent the cover 21 from being completely separated from the supporting base 18, thus avoiding also the accidental removal of the cover 21 itself.

It is evident that the cover 21 can in any way be removed by keeping it pressed and at the same time rotating the manoeuvring wall 25 until its stop surface 28 is positioned in such a way as to prevent it from interfering with the trajectory of the cover 21.

Preferably, the manoeuvring wall 25 comprises a through opening 31 suited to slidingly house the cartridge 1.

Advantageously, said through opening 31 facilitates the insertion of the cartridge 1 in the housing 14.

Figure 5:
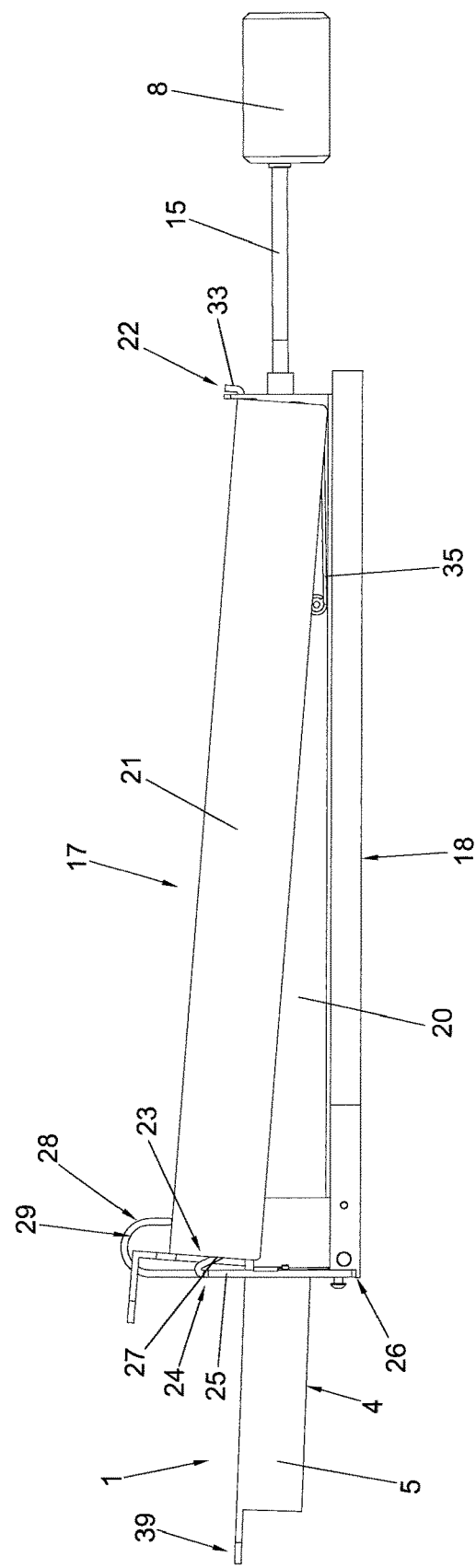
FIG. 5 shows a side view of the cartridge illustrated in FIG. 1 associated with the part illustrated in FIG. 2.

Preferably and as can be observed in FIG. 2, the through opening 31 comprises an edge 32 that is raised with respect to the supporting surface 19 and is suited to maintain the cartridge 1 inclined with respect to the supporting surface 19 during the sliding movement of the cartridge 1 towards the housing 14, as shown by way of example in FIG. 5.

In this way, the transparent bottom 4 of the cartridge 1 remains lifted from the transparent sheet 13 until the cartridge 1 has completely occupied the housing 14, with the advantage of protecting the transparent bottom 4 and the transparent sheet 13 from scratches.

Preferably, the housing 14 is removably associated with the supporting structure through moving means, not represented herein but known per se, which define for the housing 14 a direction of movement that is parallel to the plane defined by the access opening 3.

Said moving means make it possible to move the cartridge 1 with respect to the modelling plate during the production of the object, in such a way as to periodically modify the area of the transparent bottom 4 of the cartridge 1 and of the transparent sheet 13 exposed to radiation, with the advantage of making them last longer.

Furthermore, the feed duct 15 that connects the cartridge 1 to the air feeding device 8 is deformable, so as to allow air to be introduced in the reservoir 5 in any position occupied by the housing 14 during its movement.

Preferably, the modelling plate of the stereolithography machine has a circular profile, in particular with the radius only slightly smaller than the radius of the two semi-circular sections 37 of the access opening 3 of the cartridge 1.

It can be understood that said circular modelling plate allows the widest movement of the cartridge 1 in the manner described above, with the advantage of allowing the entire surface of the transparent bottom 4 and of the transparent sheet 13 to be used.

In practice, in order to insert the cartridge 1 in the housing 14, the operator places the manoeuvring wall 25 in the release position, so as to lift the cover 21, as shown in FIG. 2.

The cartridge 1 can thus be arranged in the through opening 31 of the manoeuvring wall 25, oriented so that the second membrane 11 faces the needle-shaped end 16 of the stereolithography machine.

The cartridge 1 is made slide while it is in contact with the raised edge 32 of the through opening 31, as shown in FIG. 5, until it is completely inserted in the housing 14, as shown in FIG. 4.

During said movement, the needle-shaped end 16 of the feed duct 15 perforates the second membrane 11 of the cartridge 1 and becomes positioned so that it passes through it.

Successively, the cover 21 can be lowered until the manoeuvring wall 25 snaps in the stop position, as shown in FIGS. 6 and 7.

At this point, the machine is ready for use.

When necessary, during the production of the three-dimensional object, the air feeding device 8 is operated in such a way as to generate a difference between the pressure present in the reservoir 5 and the pressure present in the container 2 that is sufficient to cause the valve means 6 to open, so as to have the base material contained in the reservoir 5 flow towards the container 2.

When the base material has reached a sufficient level in the container 2, the air feeding device 8 is operated in such a way as to reduce said pressure difference, causing the valve means 6 to close spontaneously and the flow to stop.

Preferably, the air feeding device 8 as described above is operated by the logic unit of the machine, which also serves for controlling the emitter means, the modelling plate and the moving means of the housing 14.

According to the above, it can be understood that the cartridge and the machine described above achieve all the objects of the invention.

In particular, the cartridge can be produced with no need to use complex components, thus simplifying its production.

In particular, the only movable components are the first membranes and the second membrane, which however are inexpensive components easily available on the market.

Furthermore, the fact that the reservoir is connected to the air feeding device by simply positioning the cartridge in the housing, with no need to operate any valve, makes the manoeuvre simple and rapid.

The invention claimed is:

1. Cartridge for a stereolithography machine, comprising:
a container delimited by a wall and provided with an access opening and with a transparent bottom opposite said access opening;
a reservoir suited to contain a liquid or pasty base material;
valve means connecting said reservoir to said container for the passage of said base material;
wherein said valve means are configured to open when the difference between the pressure present in said reservoir and the pressure present in said container is at least equal to a predefined value and to spontaneously close when said pressure difference is lower than said predefined value, said reservoir being unremovably associated with said container and comprising tight connection means for connection to an external air feeding device.

2. Cartridge according to claim 1, wherein said valve means comprise a first membrane provided with a hole that is normally closed and configured to open elastically due to the effect of said pressure difference at least equal to said predefined value.

3. Cartridge according to claim 1, wherein said connection means comprise a second membrane belonging to the wall of said reservoir and suited to be perforated by a needle-shaped element while at the same time maintaining tightness of said connection means when said needle-shaped element is arranged so that it passes through said second membrane.

4. Cartridge according to claim 1, wherein said reservoir is provided with an annular wall that delimits said container perimetrically.

5. Cartridge according to claim 4, wherein said annular wall comprises two mutually facing sections with semi-circular profile.

6. Cartridge according to claim 4, wherein said transparent bottom is perimetrically delimited by an outer edge, said outer edge being housed in a cavity belonging to said reservoir in such a way as to remain within the overall dimensions of said reservoir.

7. Cartridge according to claim 1, wherein said reservoir is internally delimited by an inclined wall that forms, together with said transparent bottom, an angle that is larger than 90° and smaller than 180°, said valve means being arranged at the level of the edge of said inclined wall that is nearest to said container.

8. Stereolithography machine comprising a supporting structure and a housing associated with said supporting structure, configured to removably house in a stable operating position a cartridge according to claim 1, wherein said stereolithography machine comprises an air feeding device provided with a feed duct suited to be tightly connected to said connection means of said cartridge when said cartridge is arranged in said housing, said air feeding device being suited to be operated in such a way as to modify the pressure present in said reservoir.

9. Stereolithography machine according to claim 8, wherein said cartridge is in accordance with claim 3, said feed duct comprising a needle-shaped end suited to be arranged through said second membrane when said cartridge is arranged in said operating position.

10. Stereolithography machine according to claim 8, wherein said housing comprises stop means configured to maintain said cartridge in said operating position, said stop means being suited to be released in such a way as to disconnect said cartridge from said housing.

11. Stereolithography machine according to claim 10, wherein said housing comprises a supporting base suited to support said cartridge on the side corresponding to said transparent bottom, said supporting base defining a supporting surface delimited by a containment edge projecting from said supporting surface and suited to be arranged in contact with said cartridge so as to prevent the sliding movement of said cartridge on said supporting surface, said stop means comprising a cover suited to face said supporting surface so that said cover can be arranged in contact with said cartridge on the opposite side with respect to said supporting surface.

12. Stereolithography machine according to claim 11, wherein said cover has a first edge revolvingly associated with said supporting base, snap-fitting means being provided in order to releasably connect to said supporting base a second edge of said cover opposite said first edge.

13. Stereolithography machine according to claim 12, wherein said containment edge comprises a manoeuvring wall provided with a first end and with a second end mutually opposing each other, said first end being revolvingly associated with said supporting base in such a way as to define for said manoeuvring wal:
  a stop position, in which said second end is arranged against said cover when said cover is arranged in contact with said cartridge, in such a way as to prevent the rotation of said cover; and
  a release position, in which said second end is arranged in such a way as to allow the rotation of said cover in the direction corresponding to the opening of said cover with respect to said supporting base.

14. Stereolithography machine according to claim 13, wherein said second end is provided with a stop surface suited to limit said rotation of said cover.

15. Stereolithography machine according to claim 14, wherein said stop surface defines a concave portion facing said second edge of said cover, said second edge being configured so as to be arranged inside said concave portion in such a way as to limit the rotation of said manoeuvring wall.

16. Stereolithography machine according to claim 13, wherein said stereolithography machine comprises first elastic means suited to force the return of said manoeuvring wall from said release position towards said stop position.

17. Stereolithography machine according to claim 13, wherein said manoeuvring wall comprises a through opening suited to slidingly house said cartridge.

18. Stereolithography machine according to claim 17, wherein said through opening comprises an edge that is raised with respect to said supporting surface and suited to maintain said cartridge inclined with respect to said supporting surface in such a way that said transparent bottom remains lifted from said supporting surface.

19. Stereolithography machine according to claim 12, wherein said first edge of said cover is provided with at least one tab removably inserted in a corresponding opening belonging to said supporting base, said at least one tab and said opening being configured in such a way as to allow the rotation of said cover with respect to said supporting base and the removal of said cover from said supporting base.

20. Stereolithography machine according to claim 12, wherein said stereolithography machine comprises second elastic means suited to force the rotation of said cover in the opening direction with respect to said supporting base.

21. Stereolithography machine according to claim 8, wherein said housing is removably associated with said supporting structure according to a direction of movement that is parallel to the plane defined by said access opening, said feed duct being deformable.

22. Stereolithography machine according to claim 8, wherein said feed duct is configured in such a way that it can be removably connected to said connection means.

23. Method for using a cartridge according to claim 3, wherein it comprises the following operations:
  preparing a stereolithography machine comprising a feed duct operatively connected to an air feeding device and provided with a needle-shaped end suited to perforate said second membrane of said cartridge;
  inserting said needle-shaped end through said second membrane;
  operating said air feeding device in such a way as to generate a difference higher than said predefined value between the pressure present in said reservoir and the pressure present in said container.

* * * * *